H. F. BOYENS.
FURROW WHEEL STEERING MECHANISM.
APPLICATION FILED MAY 15, 1917.
1,252,228.
Patented Jan. 1, 1918.
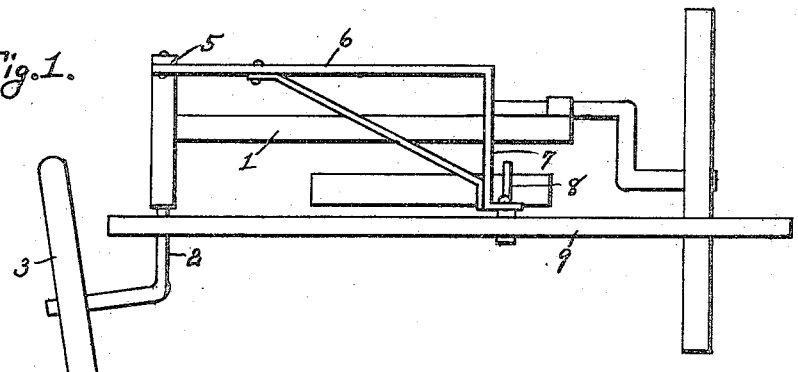
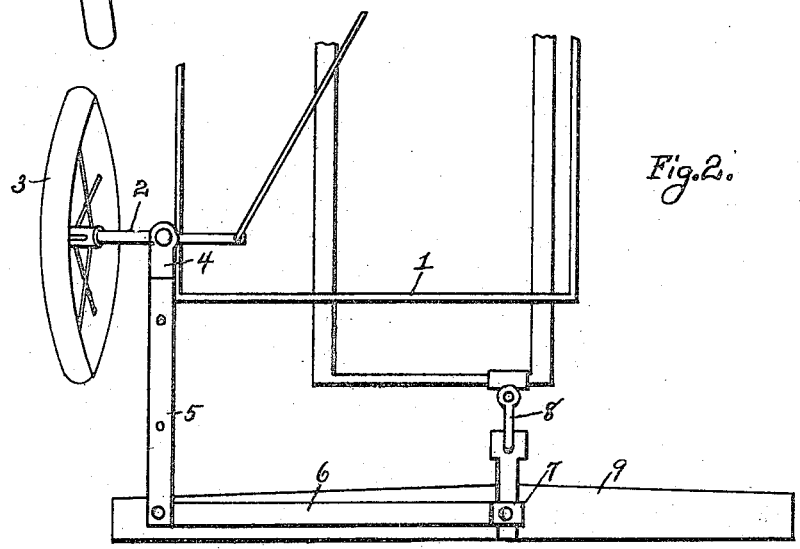
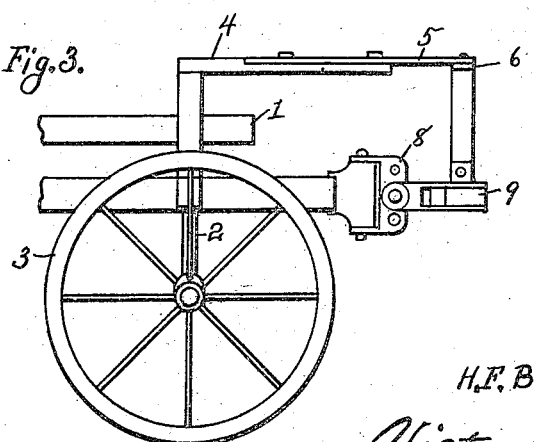
INVENTOR
H. F. Boyens,
BY *Victor J. Evans*
ATTORNEY

UNITED STATES PATENT OFFICE.

HENRY F. BOYENS, OF SCHNEIDER, INDIANA.

FURROW-WHEEL-STEERING MECHANISM.

1,252,228.   Specification of Letters Patent.   Patented Jan. 1, 1918.

Application filed May 15, 1917. Serial No. 168,733.

*To all whom it may concern:*

Be it known that I, HENRY F. BOYENS, a citizen of the United States, residing at Schneider, in the county of Lake and State of Indiana, have invented new and useful Improvements in Furrow-Wheel-Steering Mechanism, of which the following is a specification.

This invention relates to steering mechanisms especially adapted to be used upon furrow wheels of braking plows and it consists in the novel features hereinafter described and claimed.

An object of the invention is to provide a steering mechanism of the character stated which is of simple and durable structure and which operatively connects the furrow wheel of a plow with the clevis thereof in order that the said wheel may be steered as the clevis is turned or swung with relation to the frame of the plow. An advantage incident to this structural arrangement is that the draft animal which is compelled to travel in the furrow is relieved of the strain occasioned by the turning of the steering wheel and this strain is distributed among all of the draft animals of the team.

With the above object in view the mechanism includes a bar which is attached to the head of the spindle which carries the furrow wheel and an arm pivotally connected with the said bar and pivotally connected with the clevis at the point where it is attached to the doubletree of the draft appliance.

In the accompanying drawing:—

Figure 1 is a front view of a plow showing the steering mechanism applied;

Fig. 2 is a fragmentary plan view of the same.

Fig. 3 is a fragmentary side elevation of the same.

As illustrated in the accompanying drawing, the frame 1 of the plow to which the steering mechanism is applied is of the usual pattern and a spindle 2 is journaled at the corner of the frame in usual manner. A furrow wheel 3 of conventional form is journaled upon the spindle 2 and the spindle 2 carries at its upper end a head 4. A bar 5 is attached to the head 4 and one end of an arm 6 is pivotally connected with the forward end of the bar 5. The arm 6 carries a bracket 7 which is pivotally connected at its lower end with the clevis 8 at the point where the said clevis is pivotally connected with the tree 9. The clevis 8 is pivotally connected with the beams of the plow in the usual manner.

By this arrangement it will be seen that when the draft animals are hitched to the tree 9 and as they are turned during their travel from a straight line course, the clevis 8 is swung with relation to the plow beam and the tree 9 is carried with the same. Therefore the bracket 7 and arm 6 are moved longitudinally and the forward end of the bar 5 is swung. This in turn swings the head 4 and turns the spindle 2 whereby the furrow wheel 3 is steered or simultaneously turned in the same general direction in which the draft animals are turned or guided.

From the foregoing description taken in conjunction with the accompanying drawing, it will be seen that a steering mechanism of simple and durable structure is provided and that the same relieves the furrow animal of the major portion of the strain incident to steering the furrow wheel and this strain is distributed among all of the draft animals of the team.

Having described the invention what is claimed is:—

In combination with a plow frame having a pivoted spindle with a furrow wheel journaled thereon, and a pivoted clevis, a steering mechanism comprising a bar fixed to the spindle, an arm pivotally connected with the bar and having a depending bracket, said bracket being pivotally connected with the clevis, the bar, arm and bracket being located above the clevis and so arranged that the bar and clevis are held parallel and the arm normally disposed at a right angle to both, the points of pivotal connection between the arm and the bar and the bracket and the clevis lying normally in a plane at a right angle to the straight forward line of draft of the plow frame.

In testimony whereof I affix my signature.

HENRY F. BOYENS.

Copies of this patent may be obtained for five cents each, by addressing the "Commissioner of Patents, Washington, D. C."